(12) United States Patent
Takahashi et al.

(10) Patent No.: US 9,190,686 B2
(45) Date of Patent: Nov. 17, 2015

(54) FUEL CELL STACK

(75) Inventors: Ken Takahashi, Shimotsuga-gun (JP); Daisuke Wachi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 13/591,869

(22) Filed: Aug. 22, 2012

(65) Prior Publication Data

US 2012/0321985 A1 Dec. 20, 2012

Related U.S. Application Data

(62) Division of application No. 12/483,864, filed on Jun. 12, 2009.

(30) Foreign Application Priority Data

Jun. 13, 2008 (JP) ................................. 2008-155540

(51) Int. Cl.
*H01M 2/20* (2006.01)
*H01M 8/10* (2006.01)
*H01M 8/24* (2006.01)

(52) U.S. Cl.
CPC ............ *H01M 8/1002* (2013.01); *H01M 8/241* (2013.01); *H01M 8/247* (2013.01); *H01M 8/2475* (2013.01); *H01M 8/248* (2013.01); *Y02E 60/521* (2013.01)

(58) Field of Classification Search
None
See application file for complete search history.

(56) References Cited

U.S. PATENT DOCUMENTS

| 3,099,543 | A | 7/1963 | Malmstrom et al. |
| 2003/0096147 | A1 | 5/2003 | Badding et al. |
| 2004/0180255 | A1* | 9/2004 | Maus et al. ...................... 429/35 |
| 2005/0158604 | A1 | 7/2005 | Wariishi et al. |
| 2007/0054172 | A1 | 3/2007 | Ueda |
| 2007/0207372 | A1* | 9/2007 | Kikuchi et al. ................. 429/38 |
| 2007/0248866 | A1* | 10/2007 | Osenar et al. ................... 429/34 |
| 2008/0115669 | A1* | 5/2008 | Edlund et al. ...................... 96/9 |

FOREIGN PATENT DOCUMENTS

| JP | 2001-319673 | 11/2001 |
| JP | 2004-303587 | 10/2004 |

* cited by examiner

*Primary Examiner* — Bijay Saha
(74) *Attorney, Agent, or Firm* — Nelson Mullins Riley & Scarborough LLP; Anthony A. Laurentano

(57) ABSTRACT

A casing of a fuel cell stack has stack deformation prevention structure for limiting the change of an interval between end plates on the lower side in a direction of gravity, due to swelling of the lower side of the stack body in the direction of gravity. The stack deformation prevention structure is configured such that elastic modulus of a side plate provided on a lower side of the stack body in the direction of gravity is higher than elastic modulus of a side plate provided on an upper side of the stack body in the direction of gravity.

2 Claims, 16 Drawing Sheets

FUEL CELL STACK

RELATED APPLICATIONS

This application is a divisional of U.S. application Ser. No. 12/483,864, filed Jun. 12, 2009, which claims priority to Japanese Application No. 2008-155540, filed Jun. 13, 2008, the disclosures of each of which are incorporated herein by reference in their entireties. The contents of any patents, patent applications, and references cited throughout this specification are hereby incorporated by reference in their entireties.

BACKGROUND OF THE INVENTION

1. Field of the Invention

The present invention relates to a fuel cell stack which includes a stack body formed by stacking a plurality of unit cells in a horizontal direction, and a pair of end plates sandwiching the stack body. Each of the unit cells includes an electrolyte electrode assembly and separators sandwiching the electrolyte electrode assembly. The electrolyte electrode assembly includes a pair of electrodes and an electrolyte interposed between the electrodes.

2. Description of the Related Art

For example, a solid polymer electrolyte fuel cell employs an electrolyte membrane (electrolyte) comprising a polymer ion exchange membrane. The electrolyte membrane is interposed between an anode and a cathode to form a membrane electrode assembly. The membrane electrode assembly is sandwiched between separators to form a fuel cell. In use, normally, a predetermined number of (e.g., several tens to several hundreds of) fuel cells are stacked together to form a fuel cell stack to obtain the desired electrical energy.

At the time of power generation in the fuel cell, by electrochemical reactions of hydrogen and oxygen, water is produced. Therefore, the power generation performance tends to be changed easily depending on the internal state of the produced water. Therefore, the state of the produced water needs to be managed suitably.

In this regard, for example, a fuel cell apparatus as disclosed in Japanese Laid-Open Patent Publication No. 2001-319673 is known. In the conventional technique, as shown in FIG. 16, a fuel cell stack 3 and a compression stress regulator mechanism 4 are provided. Hydrogen from a hydrogen supply apparatus 1 and oxygen from an oxygen supply apparatus 2 are used as fuels for power generation in the fuel cell stack 3. The compression stress regulator mechanism 4 regulates compression stress applied to the fuel cell stack 3.

The compression stress regulator mechanism 4 includes a surface pressure applying member 5, a spherical body 6, a screw 7, and a motor 8. The surface pressure applying member 5 is attached to an end of the fuel cell stack 3. The surface pressure applying member 5 applies a surface pressure to the fuel cell stack 3. The spherical body 6 applies an axial force uniformly to the surface pressure applying member 5. The screw 7 applies the axial force to the spherical body 6. The motor 8 rotates the screw 7.

According to the disclosure, by operation of the compression stress regulator mechanism 4, compression stress is regulated to adjust the space for movement of water in the fuel cell stack 3 to achieve the desired humidification state in the fuel cell stack 3.

In the fuel cell stack 3, swelling of the electrolyte membrane occurs by the water produced in the power generation. In particular, swelled portion becomes large, in particular, on the lower side in the direction of gravity. Thus, difference in swelling occurs in the electrolyte membrane along the direction of gravity.

However, in the conventional technique, the spherical body 6 presses substantially the center of the surface pressure applying member 5 attached to the end of the fuel cell stack 3, and the swelling difference in the direction of gravity, in the electrolyte membrane cannot be eliminated. Thus, for example, when the fuel cell stack 3 is placed in a casing (box), the load is applied non-uniformly to the fuel cell stack 3 due to the difference in swelling. As a result, the casing is deformed undesirably.

SUMMARY OF THE INVENTION

The present invention has been made to solve the problem of this type, and an object of the present invention is to provide a fuel cell stack in which stack deformation due to swelling difference in a direction of gravity of the electrolyte is suppressed suitably.

The present invention relates to a fuel cell stack which comprises a stack body formed by stacking a plurality of unit cells in a horizontal direction. A pair of end plates sandwiches the stack body. Each of the unit cells includes an electrolyte electrode assembly and separators sandwiching the electrolyte electrode assembly. The electrolyte electrode assembly includes a pair of electrodes and an electrolyte interposed between the electrodes.

The fuel cell stack has stack deformation prevention structure for limiting a change in an interval between the end plates on a lower side of the stack body in the direction of gravity to be not greater than a change in an interval between the end plates on an upper side of the stack body in the direction of gravity, due to swelling on the lower side of the stack body in the direction of gravity.

The lower side of the stack body in the direction of gravity herein means the lower side relative to the center of the stack body in the direction of gravity. The upper side of the stack body in the direction of gravity herein means the upper side relative to the center of the stack body in the direction of gravity.

In the present invention, in the presence of the stack deformation prevention structure, the change in the interval between the end plates on the lower side of the stack body in the direction of gravity is limited to be not greater than the change in the interval between the end plates on the upper side of the stack body in the direction of gravity, due to the swelling on the lower side of the stack body in the direction of gravity. Thus, stack deformation due to swelling of the electrolyte is suppressed suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
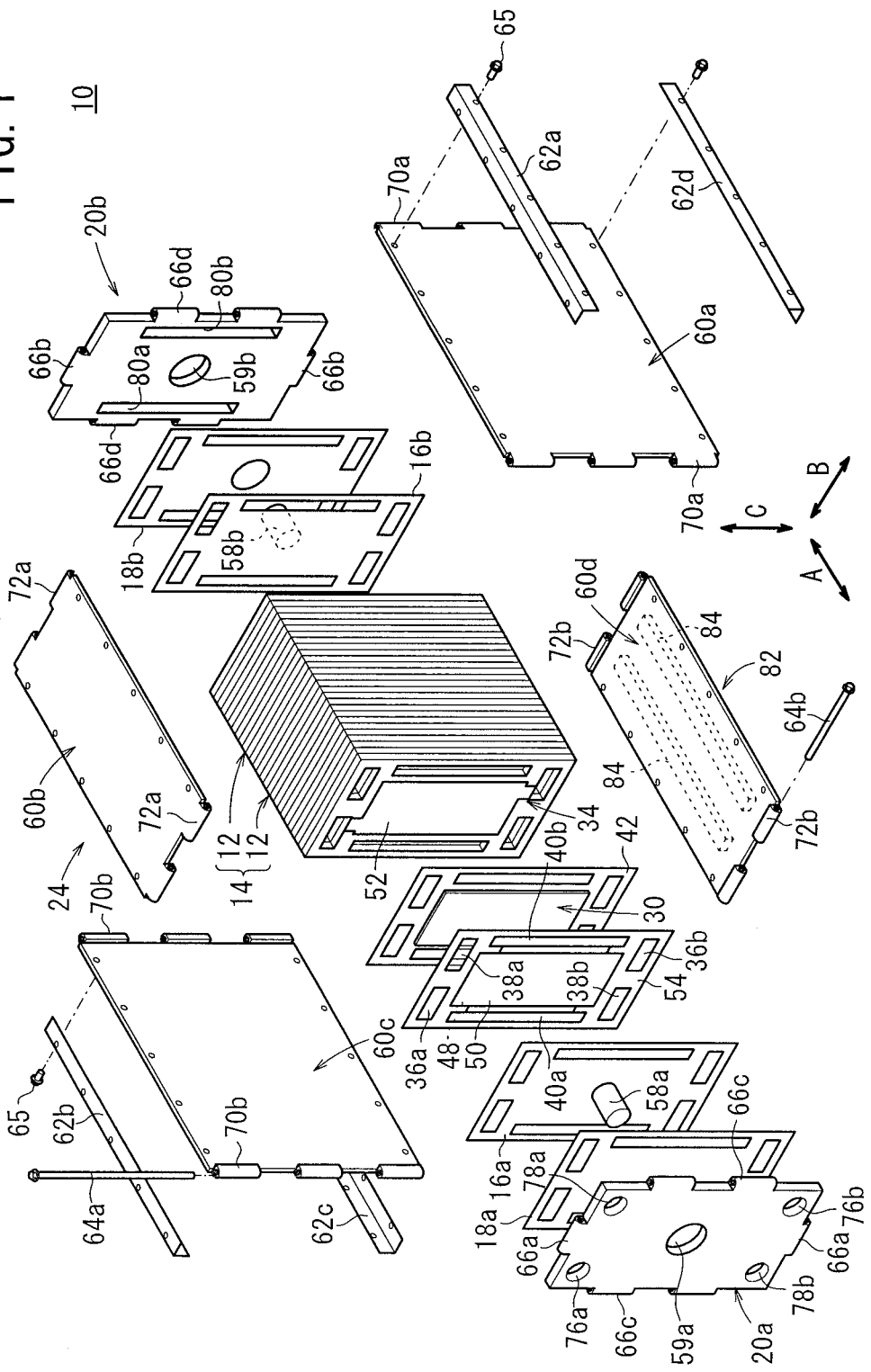
FIG. 1 is a partial exploded perspective view schematically showing a fuel cell stack according to a first embodiment of the present invention.
Figure 2:
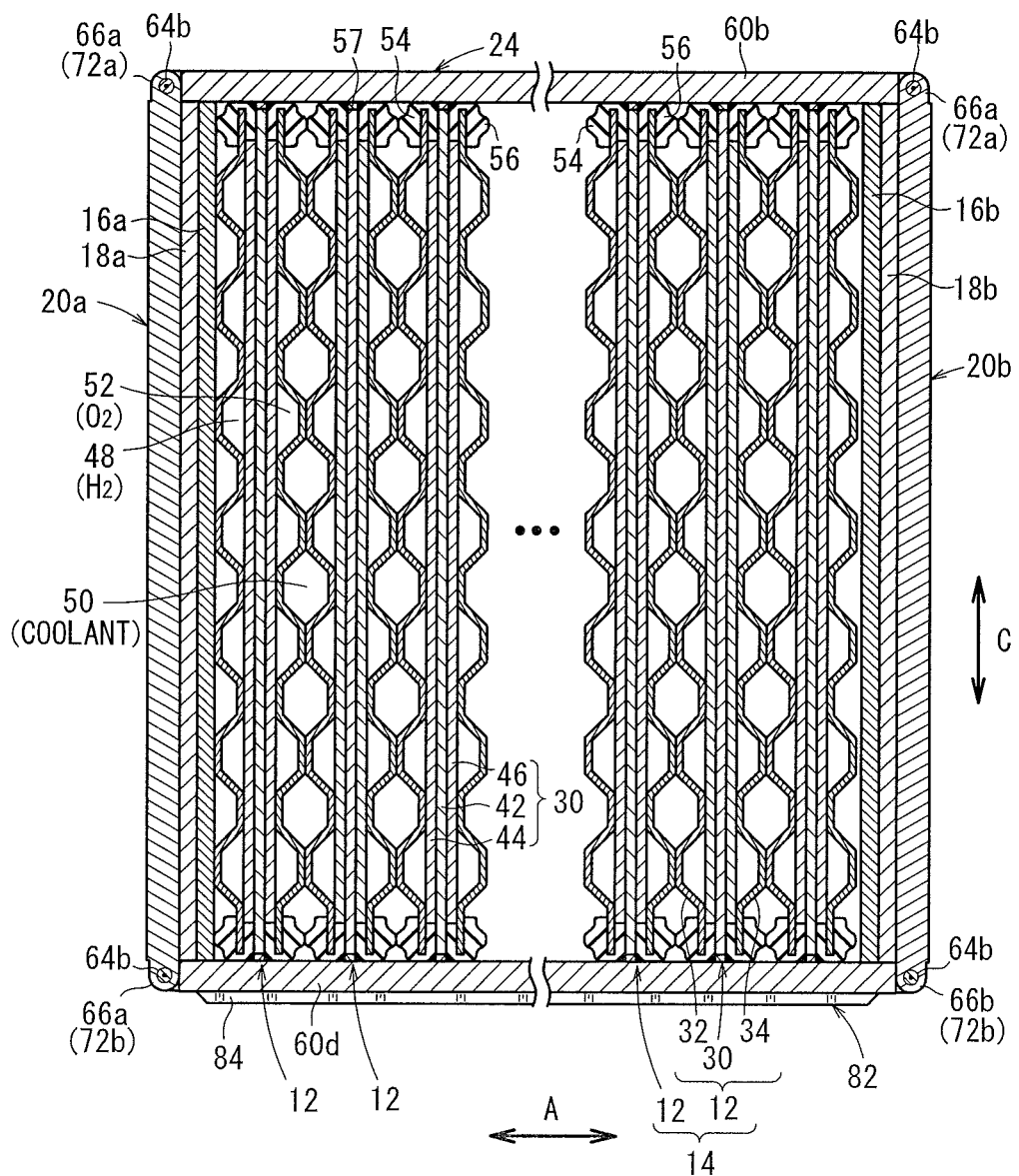
FIG. 2 is a partial cross sectional side view showing the fuel cell stack.

As shown in FIGS. 1 and 2, a fuel cell stack 10 according to a first embodiment of the present invention includes a stack body 14 formed by stacking a plurality of unit cells 12 in a horizontal direction indicated by an arrow A. At one end of the stack body 14 in a stacking direction indicated by the arrow A, a terminal plate 16a is provided. An insulating plate 18a is provided outside the terminal plate 16a, and an end plate 20a is provided outside the insulating plate (insulator) 18a. At the other end of the stack body 14 in the stacking direction, a terminal plate 16b is provided. An insulating plate 18b (insulator) is provided outside the terminal plate 16b, and an end plate 20b is provided outside the insulating plate 18b. An insulating spacer member may be used as the insulating plate 18b. The fuel cell stack 10 is placed in a box-shaped casing 24 including the rectangular and vertically elongate end plates 20a, 20b.

Figure 3:
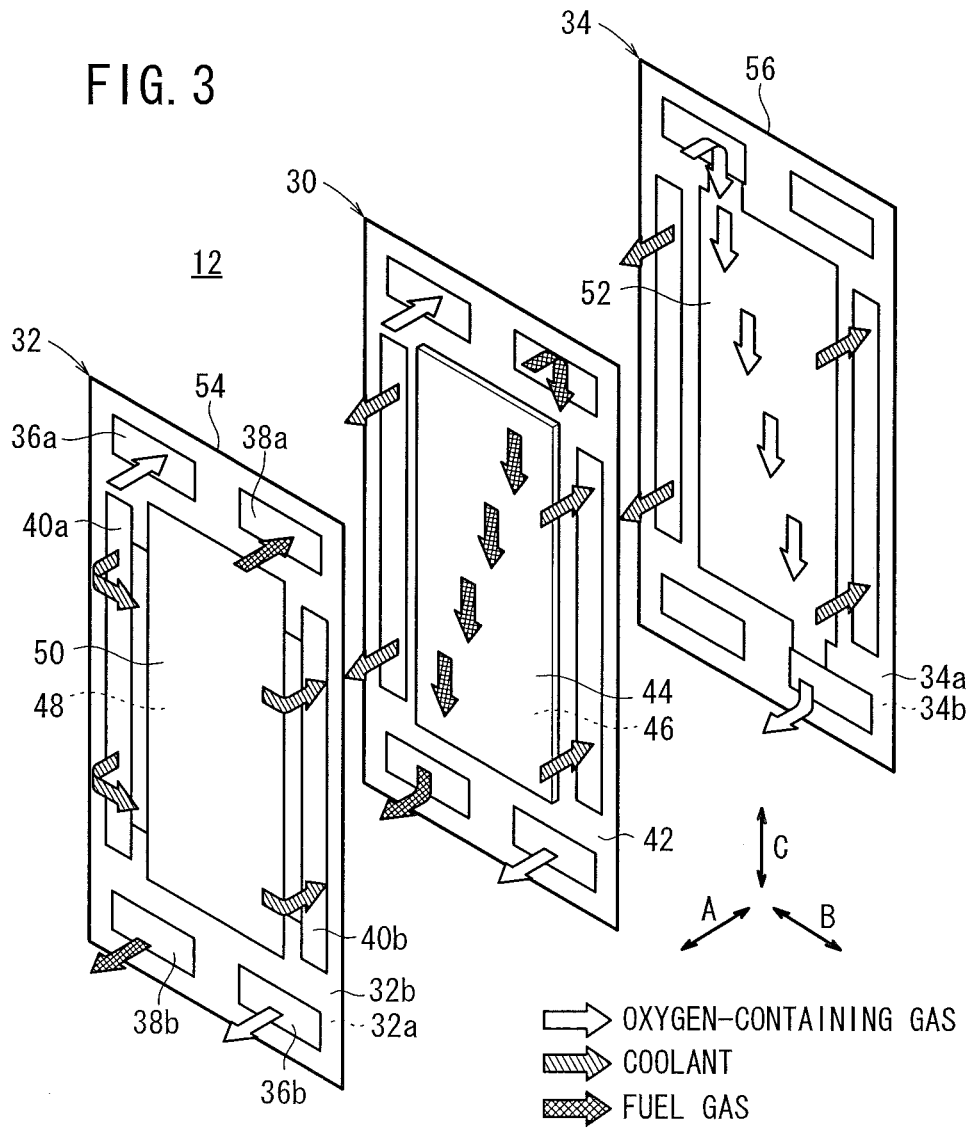
FIG. 3 is an exploded perspective view showing a unit cell of the fuel cell stack.

As shown in FIGS. 2 and 3, each of the unit cells 12 is formed by sandwiching a membrane electrode assembly (electrolyte electrode assembly) 30 between a first metal separator 32, and a second metal separator 34. The first metal separator 32 and the second metal separator 34 are thin corrugated metal plates. Each of the membrane electrode assemblies 30 and the first and second metal separators 32, 34 has a rectangular and vertically elongate shape. Instead of the first and second metal separators 32, 34, for example, carbon separators may be used.

At one end (upper end) of the unit cell 12 in a longitudinal direction indicated by an arrow C in FIG. 3, an oxygen-containing gas supply passage 36a for supplying an oxygen-containing gas and a fuel gas supply passage 38a for supplying a fuel gas such as a hydrogen-containing gas are provided. The oxygen-containing gas supply passage 36a and the fuel gas supply passage 38a extend through the unit cell 12 in the direction indicated by the arrow A.

At the other end (lower end) of the unit cell 12 in the longitudinal direction, a fuel gas discharge passage 38b for discharging the fuel gas and an oxygen-containing gas discharge passage 36b for discharging the oxygen-containing gas are provided. The fuel gas discharge passage 38b and the oxygen-containing gas discharge passage 36b extend through the unit cell 12 in the direction indicated by the arrow A.

At one end of the unit cell 12 in a lateral direction indicated by an arrow B, a coolant supply passage 40a for supplying a coolant is provided. At the other end of the unit cell 12 in the lateral direction, a coolant discharge passage 40b for discharging the coolant is provided.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are formed on both surfaces of the solid polymer electrolyte membrane 42, respectively.

The first metal separator 32 has a fuel gas flow field 48 on its surface 32a facing the membrane electrode assembly 30. The fuel gas flow field 48 extends in the direction indicated by the arrow C, and the fuel gas flow field 48 is connected between the fuel gas supply passage 38a and the fuel gas discharge passage 38b. A coolant flow field 50 is formed on a surface 32b of the first metal separator 32. The coolant flow field 50 extends in the direction indicated by the arrow B, and the coolant flow field 50 is connected between the coolant supply passage 40a and the coolant discharge passage 40b.

The second metal separator 34 has an oxygen-containing gas flow field 52 on its surface 34a facing the membrane electrode assembly 30. The oxygen-containing gas flow field 52 extends in the direction indicated by the arrow C, and the oxygen-containing gas flow field 52 is connected between the oxygen-containing gas supply passage 36a and the oxygen-containing gas discharge passage 36b. The coolant flow field 50 is formed on a surface 34b of the second metal separator 34. That is, the coolant flow field 50 is formed by overlapping the surface 34b of the second metal separator 34 and the surface 32b of the first metal separator 32.

A first seal member 54 is formed integrally on the surfaces 32a, 32b of the first metal separator 32, around the outer end of the first metal separator 32. A second seal member 56 is formed integrally on the surfaces 34a, 34b of the second metal separator 34, around the outer end of the second metal separator 34.

As shown in FIG. 2, a seal 57 is interposed between the first and the second seal member 54, 56 for preventing the outer end of the solid polymer electrolyte membrane 42 from directly contacting the casing 24.

As shown in FIG. 1, a rod shaped terminal 58a is provided at substantially the center of the terminal plate 16a, and a rod shaped terminal 58b is provided at substantially the center of the terminal plate 16b. The rod shaped terminals 58a, 58b protrude in the stacking direction. The terminals 58a, 58b pass through holes 59a, 59b formed at the center of the end plates 20a, 20b in the longitudinal direction and the lateral direction, and protrude to the outside. For example, a load such as a travel motor is connected to the terminals 58a, 58b.

As shown in FIG. 1, the casing 24 includes the end plates 20a, 20b, a plurality of side plates 60a to 60d, angle members 62a to 62d, and coupling pins 64a, 64b. The side plates 60a to 60d are provided on sides of the stack body 14. The angle members 62a to 62d are used for coupling adjacent ends of the side plates 60a to 60d together. The coupling pins 64a, 64b are used for coupling the end plates 20a, 20b and the side plates 60a to 60d. The coupling pins 64a, 64b have different lengths.

For example, the side plates 60a to 60d are thin metal plates. The side plates 60a to 60d and the angle members 62a to 62d are fixed together using bolts 65 to form the casing 24 (see FIG. 4).

Each of upper and lower ends of the end plate 20a has one first hinge 66a. Each of upper and lower ends of the end plate 20b has one first hinge 66b. Each of left and right ends of the end plate 20a has two first hinges 66c. Each of left and right ends of the end plate 20b has two first hinges 66d.

The side plates 60a, 60c are provided on opposite sides of the stack body 14 in the direction indicated by the arrow B. Each longitudinal end of the side plate 60a in the longitudinal direction indicated by the arrow A has three second hinges 70a. Each longitudinal end of the side plate 60c in the longitudinal direction indicated by the arrow A has three second hinges 70b. The side plate 60b is provided on the upper side of the stack body 14, and the side plate 60d is provided on the lower side of the stack body 14. Each longitudinal end of the side plate 60b has two second hinges 72a. Each longitudinal end of the side plate 60d has two second hinges 72b.

Figure 4:
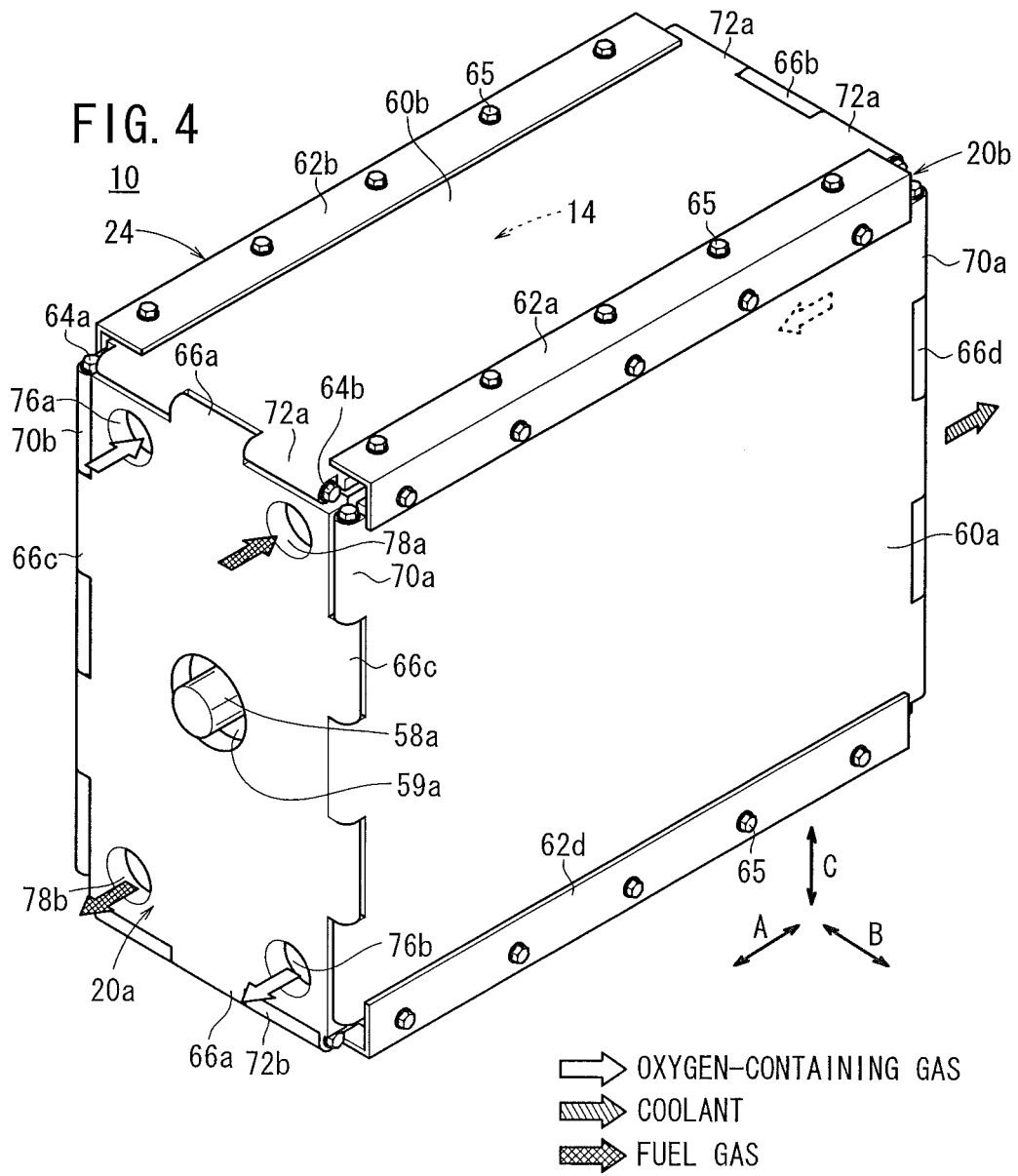
FIG. 4 is a perspective view showing the fuel cell stack.

As shown in FIG. 4, the first hinges 66c of the end plate 20a, and the first hinges 66d of the end plate 20b are positioned between the second hinges 70a of the side plate 60a, and between the second hinges 70b of the side plate 60c. The long coupling pins 64a are inserted into these hinges 66c, 66d, 70a, 70b.

Likewise, the second hinges 72a of the side plate 60b and the first hinges 66a, 66b of the upper ends of the end plates 20a, 20b are positioned alternately, and the second hinges 72b of the side plate 60d and the first hinges 66a, 66b of the lower ends of the end plates 20a, 20b are positioned alternately. The short coupling pins 64b are inserted into these hinges 66a, 66b, 72a, 72b.

As shown in FIG. 1, an oxygen-containing gas inlet 76a and a fuel gas inlet 78a are provided in the end plate 20a. The oxygen-containing gas inlet 76a is connected to the oxygen-containing gas supply passage 36a, and the fuel gas inlet 78a is connected to the fuel gas supply passage 38a. Further, an oxygen-containing gas outlet 76b and a fuel gas outlet 78b are provided in the end plate 20a. The oxygen-containing gas outlet 76b is connected to the oxygen-containing gas discharge passage 36b, and the fuel gas outlet 78b is connected to the fuel gas discharge passage 38b.

A coolant inlet 80a and a coolant outlet 80b are provided in the end plate 20b. The coolant inlet 80a is connected to the coolant supply passage 40a, and the coolant outlet 80b is connected to the coolant discharge passage 40b.

The casing 24 has stack deformation prevention structure 82 for limiting the change in the interval between the end plates 20a, 20b on the lower side in a direction of gravity due to swelling on the lower side of the stack body 14 in the direction of gravity.

The lower side of the stack body 14 in the direction of gravity herein means the lower side relative to the center of the stack body 14 in the direction of gravity. The upper side of the stack body 14 in the direction of gravity herein means the upper side relative to the center of the stack body 14 in the direction of gravity. By swelling of the lower side of the stack body 14 in the direction of gravity, the interval between the end plates 20a, 20b changes in a direction away from each other, with gradient from the upper side to the lower side in the direction of gravity.

The change in the interval between the end plates 20a, 20b due to swelling of the stack body 14 depends on the total deformation amount in the stacking direction indicated by the arrow A of the solid polymer electrolyte membranes 42 of the membrane electrode assemblies 30 of the respective unit cells 12, when the solid polymer electrolyte membranes 42 are swelled by water.

The stack deformation prevention structure 82 is configured such that elastic modulus in the stacking direction of the side plate 60d provided on the lower side of the stack body 14 in the direction of gravity becomes higher than elastic modulus in the stacking direction of the side plate 60b provided on the upper side in the direction of gravity. Specifically, a plurality of thick portions (or separate plate members) 84 extending in the direction indicated by the arrow A are provided on the bottom side of the side plate 60d. Alternatively, the thickness of the side plate 60d on the lower side may be larger than the thickness of the side plate 60b on the upper side.

Next, operation of the fuel cell stack 10 will be described below.

As shown in FIG. 4, an oxygen-containing gas is supplied to the oxygen-containing gas inlet 76a of the end plate 20a, and a fuel gas such as a hydrogen-containing gas is supplied to the fuel gas inlet 78a. Further, a coolant such as pure water or ethylene glycol is supplied to the coolant inlet 80a of the end plate 20b.

Thus, in the stack body 14 formed by stacking the unit cells 12 in the direction indicated by the arrow A, the oxygen-containing gas, the fuel gas, and the coolant are supplied to the oxygen-containing gas supply passage 36a, the fuel gas supply passage 38a and the coolant supply passage 40a in the direction indicated by the arrow A.

As shown in FIG. 3, the oxygen-containing gas is supplied from the oxygen-containing gas supply passage 36a to the oxygen-containing gas flow field 52 of the second metal separator 34, and flows along the cathode 46 of the membrane electrode assembly 30. The fuel gas is supplied from the fuel gas supply passage 38a to the fuel gas flow field 48 of the first metal separator 32, and flows along the anode 44 of the membrane electrode assembly 30.

Thus, in each of the membrane electrode assemblies 30, the oxygen-containing gas supplied to the cathode 46, and the fuel gas supplied to the anode 44 are partially consumed in the electrochemical reactions at catalyst layers of the cathode 46 and the anode 44 for generating electricity.

Then, the oxygen-containing gas partially consumed at the cathode 46 flows along the oxygen-containing gas discharge passage 36b, and is discharged to the outside through the oxygen-containing gas outlet 76b at the end plate 20b (see FIG. 4). Likewise, the fuel gas partially consumed at the anode 44 flows through the fuel gas discharge passage 38b, and is discharged to the outside through the fuel gas outlet 78b at the end plate 20a.

Further, the coolant flows into the coolant flow field 50 between the first and second metal separators 32, 34 from the coolant supply passage 40a, and flows in the direction indicated by the arrow B. After the coolant cools the membrane electrode assembly 30, the coolant moves through the coolant discharge passage 40b, and the coolant is discharged through the coolant outlet 80b at the end plate 20b (see FIG. 1).

In the embodiment, as described above, when power generation is performed in the fuel cell stack 10, in the membrane electrode assembly 30 of each unit cell 12, the solid polymer electrolyte membrane 42 is swelled by water produced in the power generation. At this time, since the produced water moves in the direction of gravity, the lower side of the solid polymer electrolyte membrane 42 in the direction of gravity is swelled significantly. In particular, in the case where the membrane electrode assembly 30 has a longitudinally elongated shape, the difference in swelling in the direction of gravity becomes significantly large.

Thus, in each of the unit cells 12, the thickness on the lower side in the direction of gravity (dimension in the direction indicated by the arrow A) becomes significantly larger than the thickness on the upper side in the direction of gravity. Therefore, a large dimensional difference in the stacking direction tends to occur, between the lower side and the upper side in a vertical direction in the stack body 14 as a whole.

In the first embodiment, the casing 24 has the stack deformation prevention structure 82. The stack deformation prevention structure 82 is configured such that the elastic modulus of the side plate 60d as the bottom plate is higher than the elastic modulus of the side plate 60b of the top plate. Therefore, even if a large stress is applied to the lower side of the stack body 14 in the direction of gravity in comparison with the upper side of the stack body 14 in the direction of gravity, due to the difference of swelling in each of solid polymer electrolyte membranes 42, the stress can be supported by the elastic modulus of the side plate 60d.

Thus, with the simple structure, the change in the interval between the end plates 20a, 20b is limited suitably, and damages, degradation and the like due to deformation of the casing 24 are prevented suitably.

Figure 5:
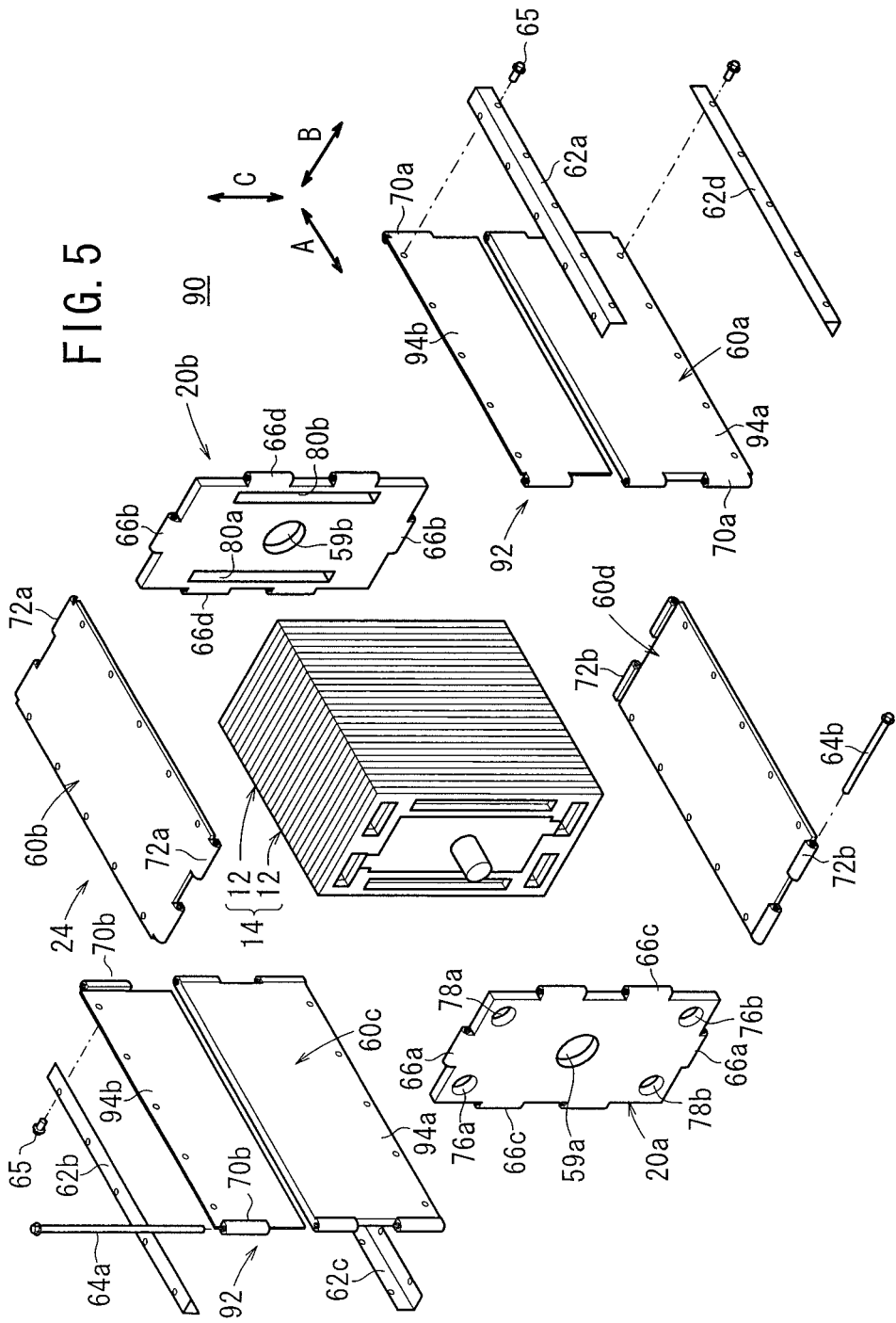
FIG. 5 is a partial exploded perspective view schematically showing a fuel cell stack according to a second embodiment of the present invention.

FIG. 5 is a partial exploded perspective view showing a fuel cell stack 90 according to a second embodiment of the present invention. The constituent elements that are identical to those of the fuel cell stack 10 according to the first embodiment are labeled with the same reference numeral, and description thereof will be omitted. Further, also in third to eighth embodiments as described later, the constituent elements that are identical to those of the fuel cell stack 10 according to the first embodiment are labeled with the same reference numeral, and description thereof will be omitted.

In the fuel cell stack 90, the side plates 60a, 60c of the casing 24 have stack deformation prevention structure 92. Each of the side plates 60a, 60c has two plate members 94a, 94b. The stack deformation prevention structure 92 is configured such that the thickness of the plate member 94a is larger than the thickness of the plate member 94b. Therefore, even if a large stress is applied to the lower side of the stack body 14 in the direction of gravity in comparison with the upper side of the stack body 14 in the direction of gravity, due to the difference of swelling in each of the solid polymer electrolyte membranes 42, the stress can be supported by the elastic modulus of the plate member 94a.

Thus, in the second embodiment, the same advantages as in the case of the first embodiment are obtained. In the second embodiment, each of the side plates 60a, 60c includes the two plate members 94a, 94b. Alternatively, each of the side plates 60a, 60c may comprise only a single plate, and the thickness of the plate may be increased continuously or stepwise from the upper side of the stack body 14 in the direction of gravity to the lower side of the stack body 14 in the direction of gravity.

Figure 6:
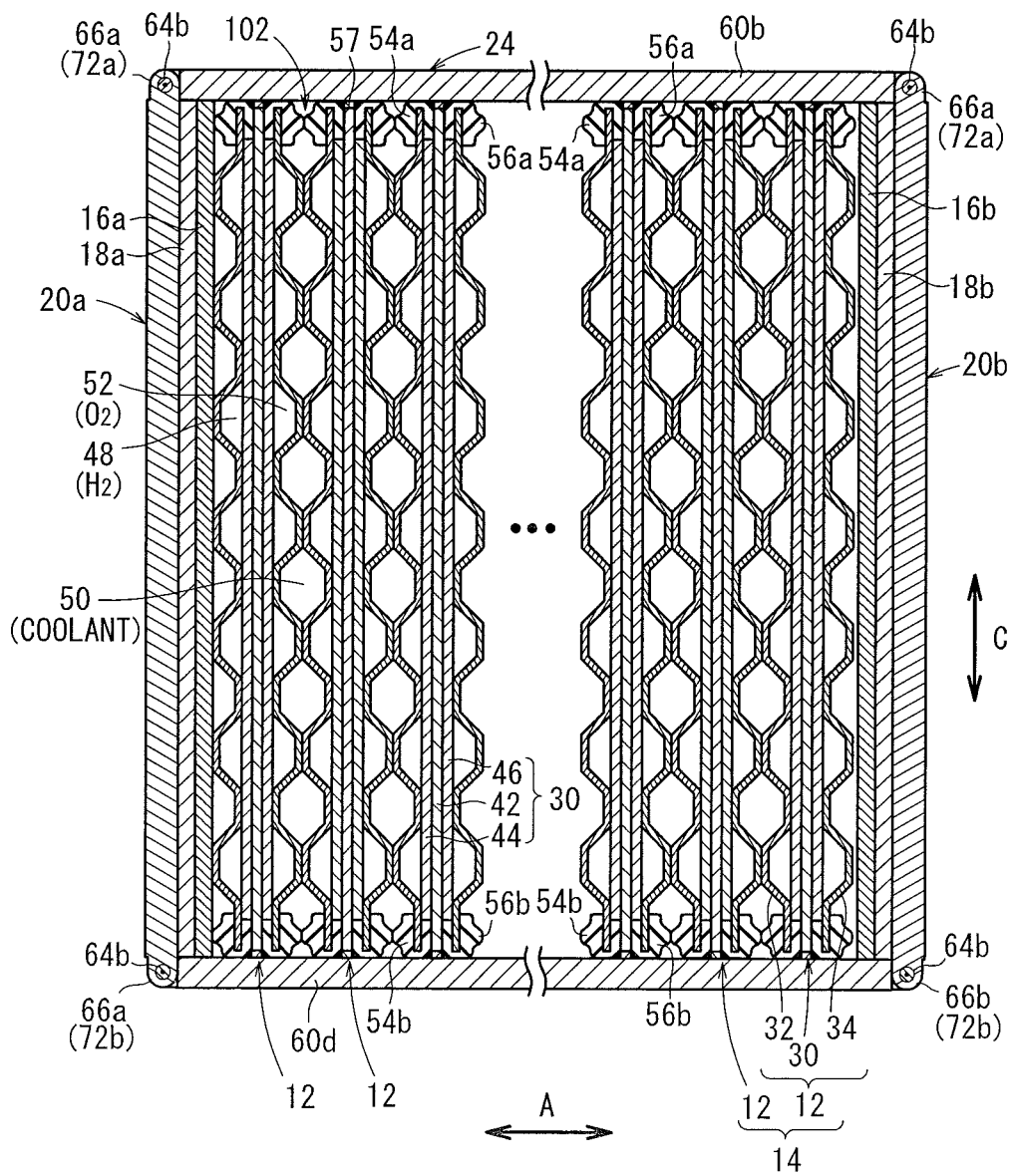
FIG. 6 is partial cross sectional side view showing a fuel cell stack according to a third embodiment of the present invention.

FIG. 6 is a partial cross sectional view showing a fuel cell stack 100 according to a third embodiment of the present invention.

In the fuel cell stack 100, each of the unit cells 12 has stack deformation prevention structure 102. The stack deformation prevention structure 102 is configured such that elastic modulus of ends 54a, 56a on the upper side of the first and second seal members 54, 56 in the direction of gravity is higher than elastic modulus of ends 54b, 56b on the lower side of the first and second seal members 54, 56 in the direction of gravity. Specifically, cross sectional areas of the first and second seal members 54, 56 or materials of the first and second seal members 54, 56 are changed for changing the elastic modulus.

In the third embodiment, elastic modulus of the ends 54a, 56a on the upper side of the first and second seal members 54, 56 in the direction of gravity is higher than elastic modulus of the ends 54b, 56b on the lower side of the first and second seal members 54, 56 in the direction of gravity. Therefore, the load supported by the ends 54a, 56a of the first and second seal members 54, 56 is larger than the load supported by the ends 54b, 56b of the first and second seal members 54, 56.

Therefore, even if swelling of the lower side of each unit cell 12 in the direction of gravity becomes large, the interval between the first and second metal separators 32, 34 on the lower side in the direction of gravity does not become large, because the interval between the first and second metal separators 32, 34 on the upper side in the direction of gravity is not narrowed in the presence of the ends 54a, 56a having high elastic modulus. Accordingly, overall deformation of the fuel cell stack 100 in the stacking direction is prevented effectively. Thus, the same advantages as in the case of the first embodiment are obtained.

Figure 7:
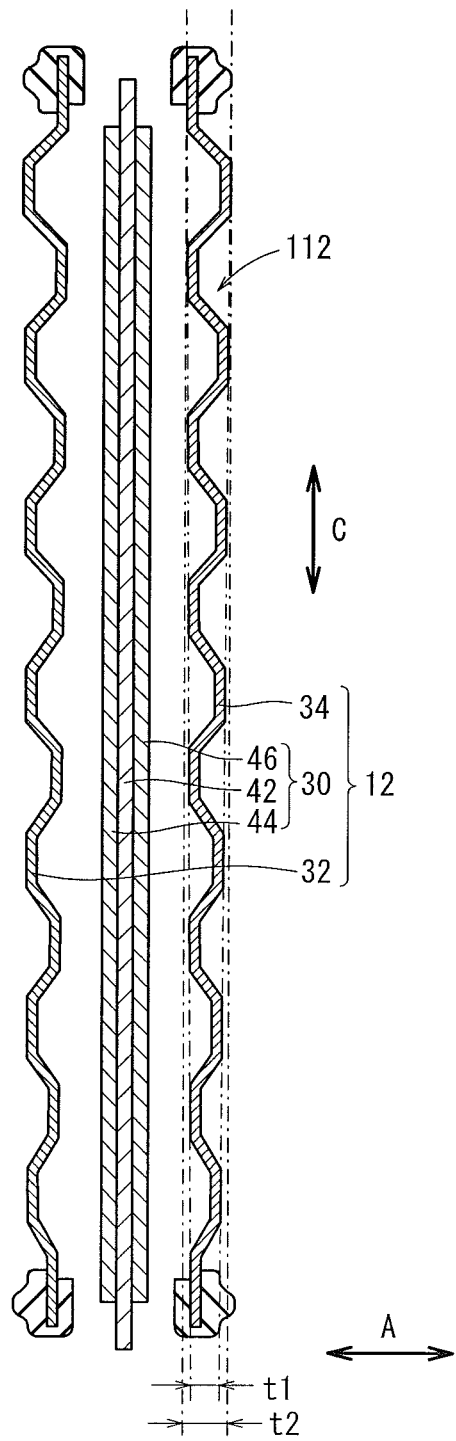
FIG. 7 is a side view showing a unit cell of a fuel cell stack according to a fourth embodiment of the present invention.

FIG. 7 is a side view showing a unit cell 12 of a fuel cell stack 110 according to a fourth embodiment of the present invention.

In the fuel cell stack 110, each of the unit cells 12 has stack deformation prevention structure 112. The stack deformation prevention structure 112 is configured such that the thickness (t1) on the lower side of the first and second metal separators 32, 34 in the direction of gravity is smaller than the thickness (t2) on the upper side of the first and second metal separators 32, 34 in the direction of gravity (t1<t2).

In the fourth embodiment, in each of unit cells 12, deformation in the stacking direction occurs easily on the lower side in the direction of gravity, in comparison with the upper side in the direction of gravity. It is because the thickness (t1) on the lower side of the first and second metal separators 32, 34 is smaller than the thickness (t2) on the upper side of the first and second metal separators 32, 34. Therefore, when the lower side of the solid polymer electrolyte membrane 42 of each unit cell 12 in the direction of gravity is swelled to a great extent in comparison with the upper side of the solid polymer electrolyte membrane 42 in the direction of gravity due to power generation, the first and second metal separators 32, 34 on the lower side in the direction of gravity are deformed easily in the stacking direction.

Thus, swelling on the lower side of each solid polymer electrolyte membrane 42 in the direction of gravity is absorbed easily by deformation of the first and second metal separators 32, 34, and the dimension (interval) in the stacking direction between the end plates 20a, 20b does not change in the fuel cell stack 110 as a whole.

Figure 8:
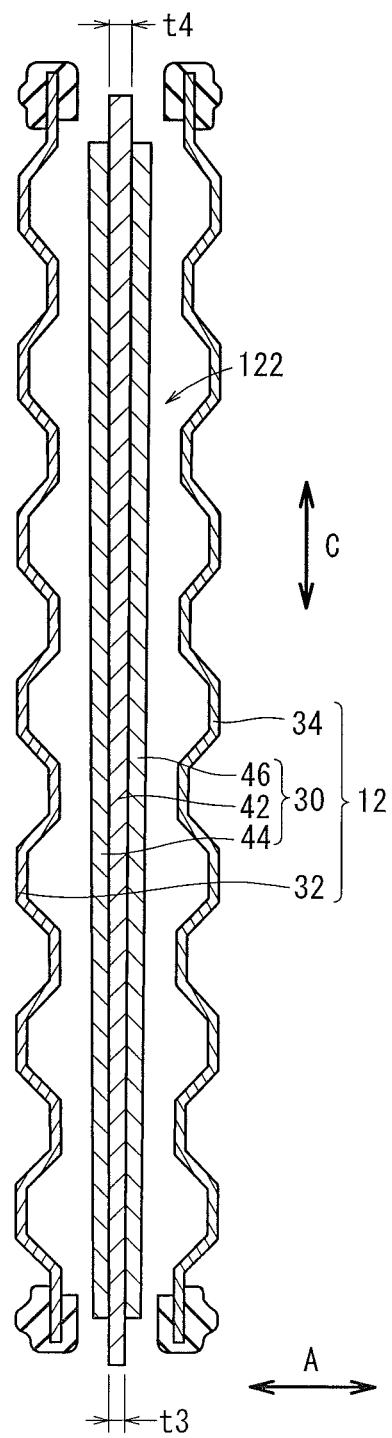
FIG. 8 is a side view showing a unit cell of a fuel cell stack according to a fifth embodiment of the present invention.

FIG. 8 is a side view showing a unit cell 12 of a fuel cell stack 120 according to a fifth embodiment of the present invention.

In the fuel cell stack 120, each of the unit cells 12 has stack deformation prevention structure 122. The stack deformation prevention structure 122 is configured such that the thickness (t3) on the lower side of the solid polymer electrolyte membrane 42 of the membrane electrode assembly 30 in the direction of gravity is smaller than the thickness (t4) on the upper side of the solid polymer electrolyte membrane 42 in the direction of gravity.

In the fifth embodiment, at the time of power generation in the fuel cell stack 120, the solid polymer electrolyte membrane 42 is swelled by absorption of water produced in the power generation. The thickness (t3) on the lower side of the solid polymer electrolyte membrane 42 in the direction of gravity, i.e., the thickness on the side where the amount of the produced water is large is smaller than the thickness (t4) on the upper side of the solid polymer electrolyte membrane 42 in the direction of gravity, i.e., the thickness on the side where the amount of the produced water is small.

Thus, by swelling, the thickness of the solid polymer electrolyte membrane 42 becomes substantially uniform along the direction of gravity, and it becomes possible to inhibit application of the non-uniform load to the fuel cell stack 120.

Figure 9:
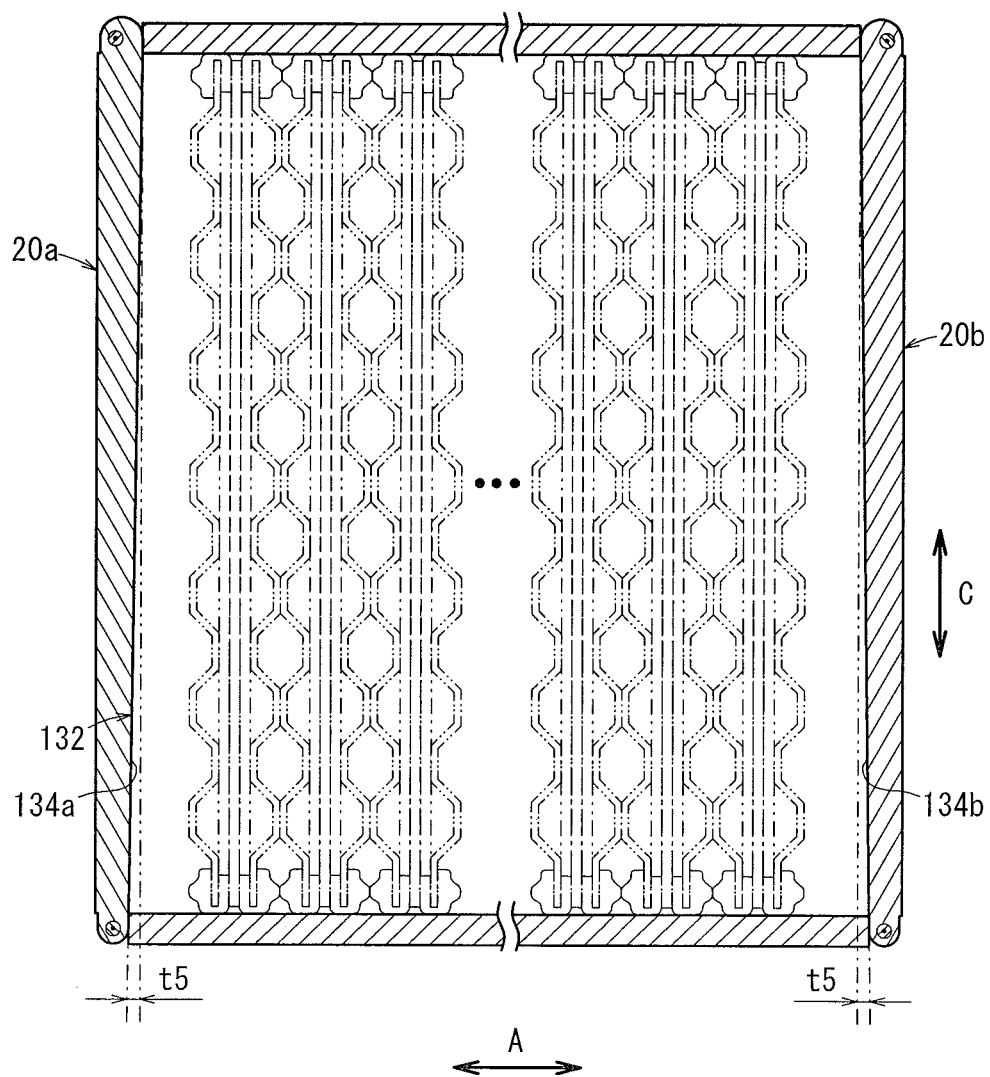
FIG. 9 is a partial cross sectional view showing a fuel cell stack according to a sixth embodiment of the present invention.

FIG. 9 is a partial cross sectional view showing a fuel cell stack 130 according to a sixth embodiment of the present invention.

The fuel cell stack 130 has stack deformation prevention structure 132. The stack deformation prevention structure 132 is configured such that tapered surfaces 134a, 134b are provided in each of the inner surfaces of the end plates 20a, 20b, and the tapered surfaces 134a, 134b are slanted outwardly, toward the lower side in the direction of gravity. The interval between the end plates 20a, 20b on the lower side in the direction of gravity is larger than the interval between the end plates 20a, 20b on the upper side in the direction of gravity (see distance t5).

In the sixth embodiment, in each of the unit cells 12, when the lower side in the direction of gravity is swelled to a greater extent in comparison with the upper side in the direction of gravity, since the interval between the end plates 20a, 20b on the lower side in the direction of gravity is larger than the interval between the end plates 20a, 20b on the upper side in the direction of gravity, the difference in swelling is absorbed in each of the unit cells 12. Thus, when swelling occurs in each unit cell 12 on the lower side in the direction of gravity, deformation of the fuel cell stack 130 is limited advantageously.

In the sixth embodiment, the end plates 20a, 20b have the tapered surfaces 134a, 134b. Alternatively, or in addition to this structure, the insulating plates 18a, 18b or the terminal plates 16a, 16b may have the similar tapered surfaces (not shown).

Figure 10:
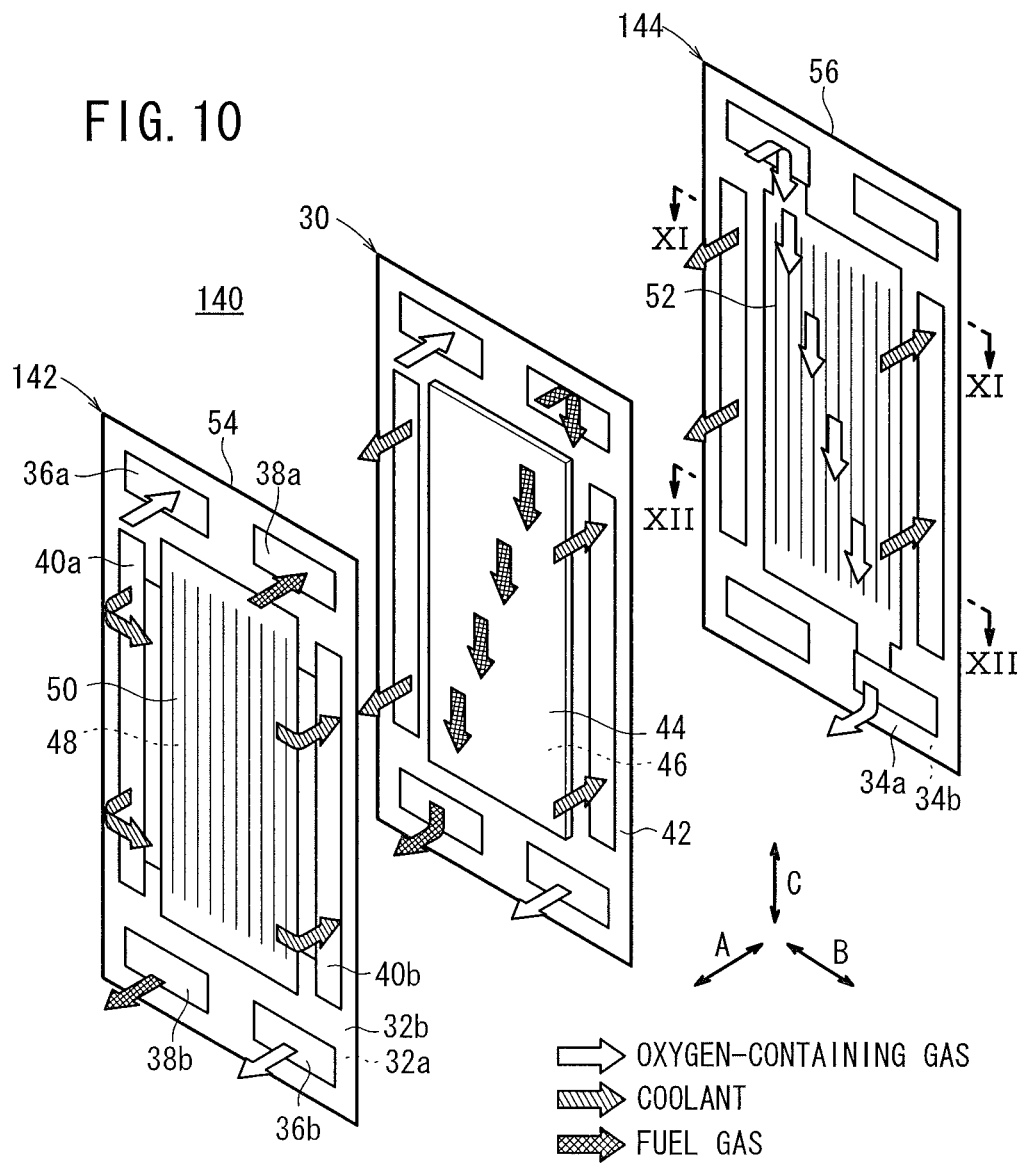
FIG. 10 is an exploded perspective view showing a unit cell of a fuel cell stack according to a seventh embodiment of the present invention.

FIG. 10 is an exploded perspective view showing a unit cell 140 of a fuel cell stack according to a seventh embodiment of the present invention.

The unit cell 140 has first and second metal separators 142, 144 sandwiching the membrane electrode assembly 30. The first and second metal separators 142, 144 are corrugated thin plates. By corrugating the first metal separator 142, a fuel gas flow field 48 is formed on a surface of the first metal separator 142 facing the membrane electrode assembly 30, and by corrugating the second metal separator 144, an oxygen-containing gas flow field 52 is formed on a surface of the second metal separator 144 facing the membrane electrode assembly 30.

Figure 11:
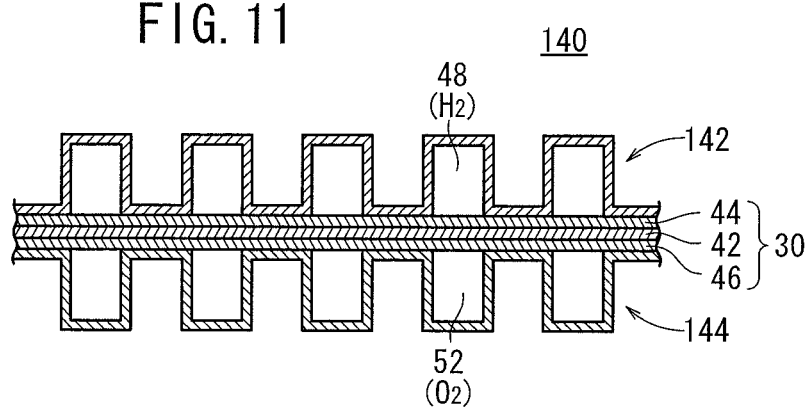
FIG. 11 is a cross sectional view showing the unit cell, taken along a line XI-XI in FIG. 10.
Figure 12:
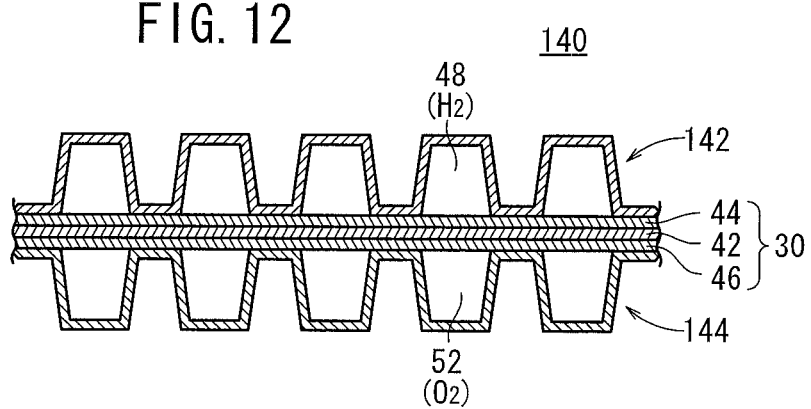
FIG. 12 is a cross sectional view showing the unit cell, taken along a line XII-XII in FIG. 10.

The fuel gas flow field 48 and the oxygen-containing gas flow field 52 has a cross sectional shape as shown in FIG. 11 on the upper side of the stack body 14 in the direction of gravity and a cross sectional shape as shown in FIG. 12 on the lower side of the stack body 14 in the direction of gravity. In the fuel gas flow field 48 and the oxygen-containing gas flow field 52, elastic modulus in the stacking direction, on the lower side of the stack body 14 in the direction of gravity is smaller than elastic modulus in the stacking direction, on the upper side of the stack body 14 in the direction of gravity. That is, the lower side of the stack body 14 can be deformed easily.

Thus, in the seventh embodiment, the unit cell 140 is deformed easily in the stacking direction, on the lower side in the direction of gravity, in comparison with the upper side in the direction of gravity. Therefore, the same advantages as in the case of the fourth embodiment are obtained. For example, swelling on the lower side of the solid polymer electrolyte membrane 42 in the direction of gravity is absorbed easily by deformation of the first and second metal separators 142, 144.

Figure 13:
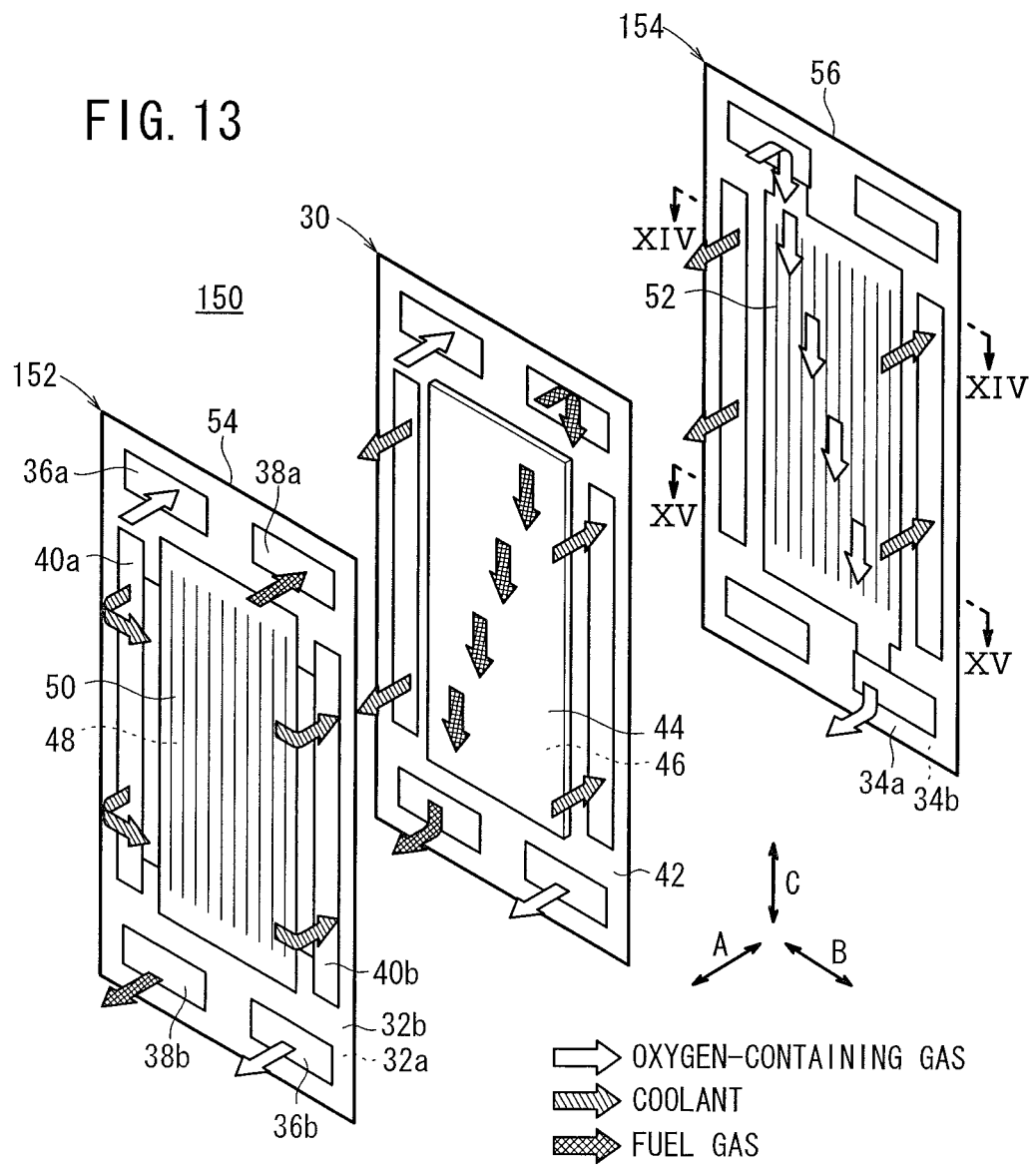
FIG. 13 is an exploded perspective view showing a unit cell of a fuel cell stack according to an eighth embodiment of the present invention.

FIG. 13 is an exploded perspective view showing a unit cell 150 of a fuel cell stack according to an eighth embodiment of the present invention.

The unit cell 150 has first and second metal separators 152, 154 sandwiching the membrane electrode assembly 30. The first and second metal separators 152, 154 are corrugated thin plates. By corrugating the first metal separator 152, a fuel gas flow field 48 is formed on a surface of the first metal separator 152 facing the membrane electrode assembly 30, and by corrugating the second metal separator 154, an oxygen-containing gas flow field 52 is formed on a surface of the second metal separator 154 facing the membrane electrode assembly 30.

Figure 14:
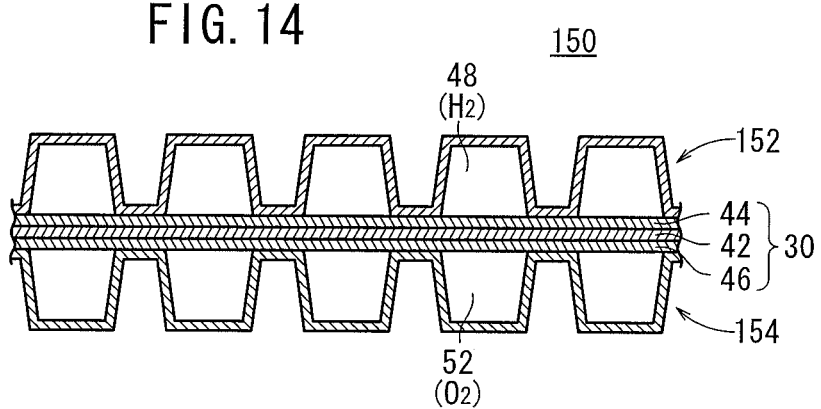
FIG. 14 is a cross sectional view showing the unit cell, taken along a line XIV-XIV in FIG. 13.
Figure 15:
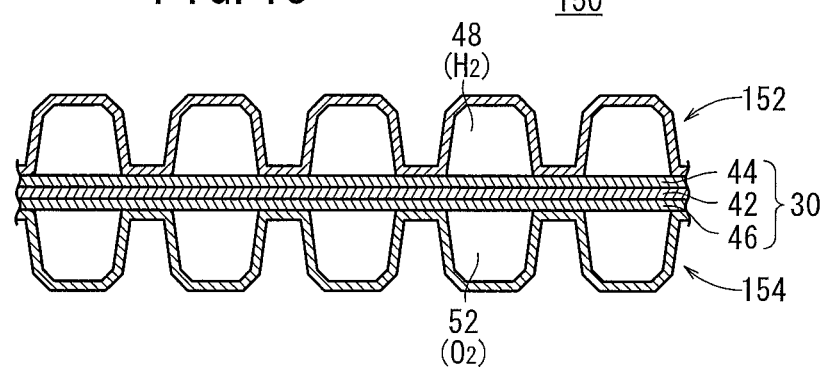
FIG. 15 is a cross sectional view showing the unit cell, taken along a line XV-XV in FIG. 13.
Figure 16:
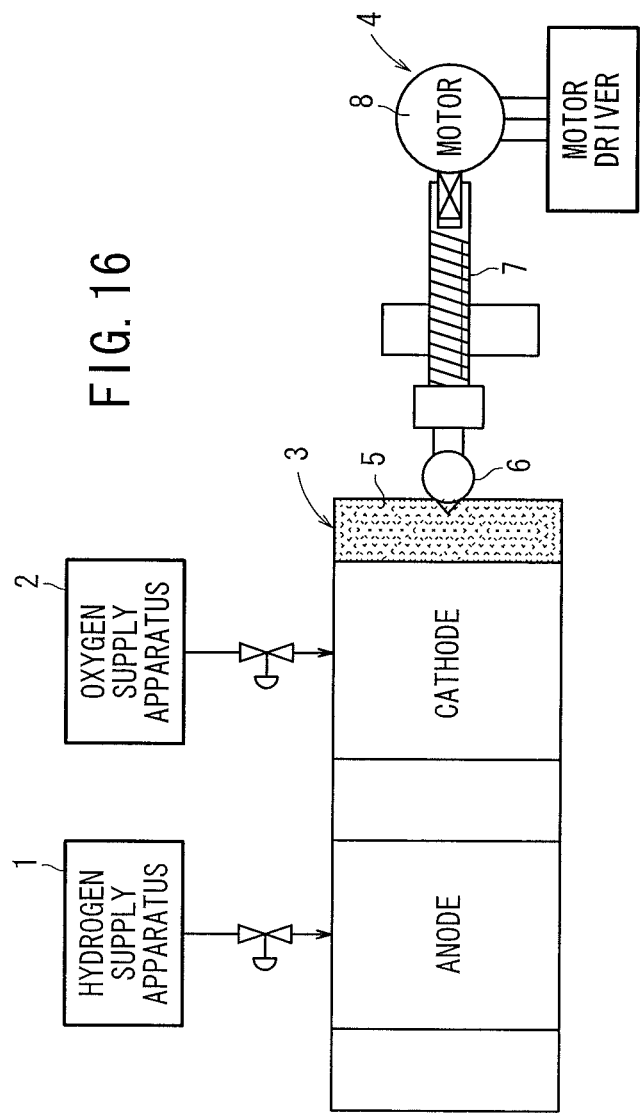
FIG. 16 is a view showing a conventional fuel cell apparatus.

The fuel gas flow field 48 and the oxygen-containing gas flow field 52 has a cross sectional shape as shown in FIG. 14 on the upper side of the stack body 14 in the direction of gravity and a cross sectional shape as shown in FIG. 15 on the lower side of the stack body 14 in the direction of gravity. In the fuel gas flow field 48 and the oxygen-containing gas flow field 52, elastic modulus in the stacking direction, on the lower side of the stack body 14 in the direction of gravity is smaller than elastic modulus in the stacking direction, on the upper side of the stack body 14 in the direction of gravity. That is, the lower side of the stack body 14 can be deformed easily.

Therefore, in the eighth embodiment, the same advantages as in the case of the seventh embodiment are obtained. For example, swelling in the direction of gravity, on the lower side of the solid polymer electrolyte membrane 42 is absorbed easily by deformation of the first and second metal separators 152, 154.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack, comprising:
a stack body formed by stacking a plurality of unit cells in a horizontal direction, a pair of end plates sandwiching the plurality of unit cells forming the stack body, the unit cells each including an electrolyte electrode assembly and separators sandwiching the electrolyte electrode assembly, the electrolyte electrode assembly including a pair of electrodes and an electrolyte interposed between the electrodes; and
a stack deformation prevention structure for limiting a change in an interval between the end plates on a lower side of the stack body in a direction of gravity to be not greater than a change in an interval between the end plates on an upper side of the stack body in the direction of gravity due to swelling on the lower side of the stack body in the direction of gravity,
wherein the stack deformation prevention structure includes tapered inner surfaces of the end plates sandwiching the stack body or tapered inner surfaces of insulators adjacent to the end plates such that at least an interval between the end plates or between the insulators on the lower side in the direction of gravity is larger than an interval between the end plates or between the insulators on the upper side in the direction of gravity, the tapered inner surfaces extending from the top of each end plate or insulator to a bottom of each end plate or insulator in the direction of gravity.

2. A fuel cell stack according to claim 1, wherein each of the electrolyte electrode assembly and the separators has a longitudinally elongated shape.

* * * * *